US012623324B2

(12) United States Patent
Ma

(10) Patent No.: US 12,623,324 B2
(45) Date of Patent: May 12, 2026

(54) DISMOUNTING DEVICE FOR WORM OR GEAR ON MOTOR SHAFT

(71) Applicant: Jianke Ma, Shenzhen (CN)

(72) Inventor: Jianke Ma, Shenzhen (CN)

( * ) Notice: Subject to any disclaimer, the term of this patent is extended or adjusted under 35 U.S.C. 154(b) by 329 days.

(21) Appl. No.: 18/460,655

(22) Filed: Sep. 4, 2023

(65) Prior Publication Data

US 2025/0073874 A1 Mar. 6, 2025

(51) Int. Cl.
*B25B 27/14* (2006.01)
*B25B 27/02* (2006.01)

(52) U.S. Cl.
CPC ............ *B25B 27/14* (2013.01); *B25B 27/023* (2013.01)

(58) Field of Classification Search
CPC .............................. B25B 27/14; B25B 27/023
See application file for complete search history.

(56) References Cited

U.S. PATENT DOCUMENTS 4,077,103 A 3/1978 Kelley
5,067,219 A 11/1991 Ulmer
6,293,004 B1 * 9/2001 Holliday ................. B25B 27/10 29/751
8,256,081 B2 * 9/2012 Fridman ............... B25B 27/062 29/244
11,679,477 B2 * 6/2023 Del Toro Manjarrez .................... B25B 27/023 137/15.18
2002/0138976 A1 10/2002 Rubino
2006/0272140 A1 * 12/2006 Kang ...................... B25B 27/02 29/278

* cited by examiner

*Primary Examiner* — Sarang Afzali

(57) ABSTRACT

A dismounting device for a worm or gear on a drive shaft includes a main housing provided with a dismounting cavity including first and second ends oppositely arranged. The first end is provided with a slot for inserting the drive shaft and the second end is provided with a dismounting assembly including an outer sleeve and an inner sleeve mounted inside the outer sleeve. The outer sleeve extends into the dismounting cavity through the second end and one end of the outer sleeve is provided with a first positioning hole being inserted by one end of the drive shaft. One end of the inner sleeve which is inserted into the outer sleeve is provided with a second positioning hole coaxially arranged with the first positioning hole. A thimble is mounted in the second positioning hole and runs through the first positioning hole and configured to abut the drive shaft.

8 Claims, 2 Drawing Sheets

DISMOUNTING DEVICE FOR WORM OR GEAR ON MOTOR SHAFT

TECHNICAL FIELD

The present utility model relates to the technical field of dismounting and mounting, and particularly to a dismounting device for a worm or gear on a motor shaft.

BACKGROUND

In the transmission process of an existing motor, a worm or gear is usually mounted on a drive shaft of the motor for power transmission, and the worm or gear is usually fixed on the drive shaft through mechanical tight fitting and violent stamping. For a micro motor, the worm or gear is difficult to be dismounted due to a small structural size.

The dismounting methods for a worm or gear of a micro motor on the market are too simple and rough. Many users adopt violent knocking for dismounting, which easily damages the motor. Some auxiliary dismounting devices that are relatively rough are employed, though the force-bearing thimbles cannot fit all the motor products of different lengths because the force-bearing thimbles are all in a fixed form. Meanwhile, when dismounting, a thimble and a drive shaft of a to-be-dismounted motor are aligned basically by hand feeling to make them be on the same horizontal line, but in the actual operation, slightly uneven stress will crush the thimble, damage the motor and injure the hands.

SUMMARY

A primary objective of the present utility model is to provide a dismounting device for a worm or gear on a motor shaft, which aims to solve the problems that the existing dismounting device is inconvenient to use, poor in versatility and prone to damaging the motor and the thimble.

In order to achieve the above objective, the present utility model provides a dismounting device for a worm or gear on a motor shaft, wherein the worm or gear is mounted on a drive shaft of a motor, and the dismounting device comprises a main housing, wherein the main housing is provided with a dismounting cavity for a dismounting operation, and the dismounting cavity comprises a first end and a second end that are oppositely arranged;

- the first end is provided with a slot for inserting the drive shaft, the worm or gear is positioned inside the dismounting cavity, and a main body of the motor is positioned outside the dismounting cavity;
- the second end is provided with a dismounting assembly, wherein the dismounting assembly comprises an inner sleeve and an outer sleeve, the outer sleeve extends into the dismounting cavity through the second end, and one end of the outer sleeve is provided with a first positioning hole being docked with one end of the drive shaft; and
- the inner sleeve is mounted inside the outer sleeve, and one end that is of the inner sleeve and that is inserted into the outer sleeve is provided with a second positioning hole, wherein the second positioning hole and the first positioning hole are coaxially arranged, and a thimble used to run through the first positioning hole to be docked with the drive shaft is mounted in the second positioning hole.

Optionally, a spacer is detachably mounted to the first end of the dismounting cavity, and the slot is formed in the spacer.

Optionally, a port of the slot is provided with rounded structures.

Optionally, the first end of the dismounting cavity is symmetrically provided with sliding grooves for mounting the spacer, and both sides of the spacer are slidably inserted into the sliding grooves.

Optionally, a side surface of the main housing is provided with a limiting hole being communicated with the sliding groove, and a side surface of the spacer is provided with a limiting groove corresponding to the limiting hole.

Optionally, the outer sleeve is threadingly mounted to the second end of the dismounting cavity.

Optionally, a nut is mounted to one end that is of the outer sleeve and that is positioned outside the dismounting cavity.

Optionally, the inner sleeve is threadingly mounted inside the outer sleeve.

Optionally, one end that is of the inner sleeve and that is positioned outside the outer sleeve is radially provided with a through hole.

Optionally, a main body of the main housing is provided as a cylindrical structure.

The present utility model has the following beneficial effects: the structure of the existing dismounting device for a worm or gear on a motor drive shaft is improved, and through a structure that adopts an inner sleeve and an outer sleeve and combines a spacer, the motor can be quickly positioned, and the drive shaft of the motor and the thimble can be coaxially arranged, thereby ensuring the concentricity therebetween, such that in the dismounting process, the misalignment is avoided, the motor is protected from damage, and both hands of the user can be effectively protected, and therefore the safety of the dismounting process is ensured.

BRIEF DESCRIPTION OF DRAWINGS

To more clearly illustrate the technical solutions in the embodiments of the present utility model or in the prior art, the drawings required to be used in the description of the embodiments or the prior art are briefly introduced below. It is obvious that the drawings in the description below are only some embodiments of the present utility model, and those of ordinary skill in the art can obtain other drawings according to structures illustrated in these drawings without creative efforts.

Figure 1:
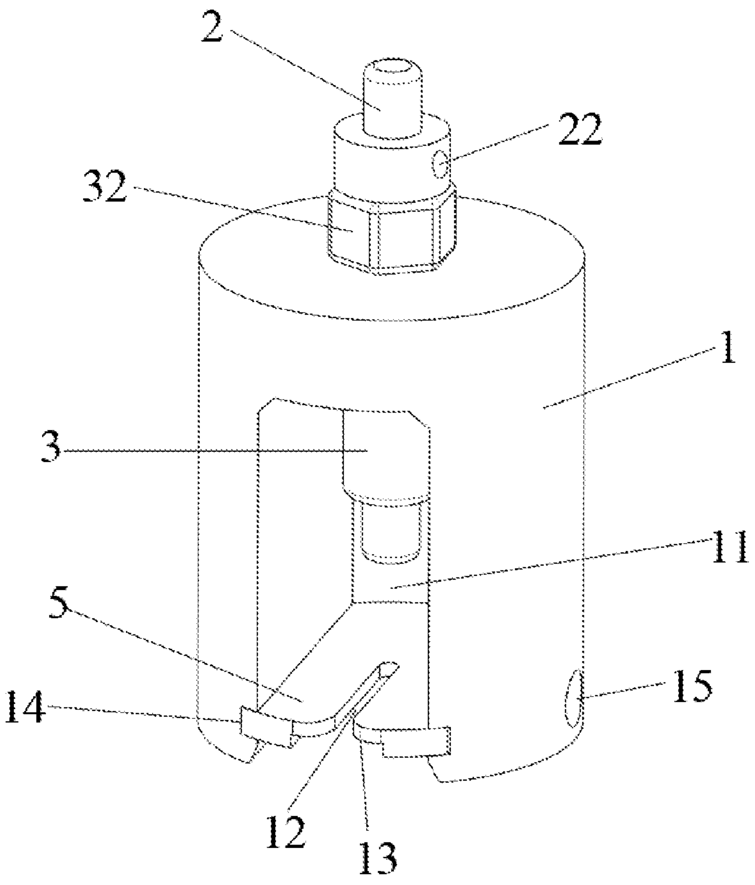
FIG. 1 is a schematic diagram of an overall structure of a dismounting device according to the present utility model.

The realization of the objectives, the functional features, and the advantages of the present utility model will be further explained in conjunction with the embodiments and with reference to the drawings.

DETAILED DESCRIPTION OF EMBODIMENTS

The technical solutions in the embodiments of the present utility model will be clearly and completely described below with reference to the drawings in the embodiments of the present utility model. It is apparent that the described embodiments are only some, but not all, embodiments of the present utility model. Based on the embodiments of the present utility model, all other embodiments obtained by those of ordinary skill in the art without creative efforts fall within the protection scope of the present utility model.

It should be noted that, if directional indications (such as upper, lower, left, right, front and rear) are involved in the embodiments of the present utility model, the directional indications are only used to explain the relative position relationships, the motion situations and the like between individual components under a certain pose (as shown in the drawings), and if the certain pose is changed, the directional indications are changed accordingly.

In addition, if there are descriptions relating to "first", "second" and the like in the embodiments of the present utility model, the descriptions of "first", "second" and the like are for descriptive purposes only and are not to be construed as indicating or implying relative importance thereof or implicitly indicating the quantities of technical features indicated. Thus, a feature defined by "first" or "second" may explicitly or implicitly include at least one such feature. In addition, "and/or" appearing herein is meant to include three parallel solutions, and taking "A and/or B" as an example, it includes solution A, or solution B, or both solution A and solution B. In addition, the technical solutions among various embodiments may be combined with each other, however, this combination must be based on that it can be realized by those of ordinary skill in the art. When the combination of the technical solutions is contradictory or cannot be realized, such combination of the technical solutions should not be considered to exist, and is not within the protection scope of the present utility model.

Figure 2:
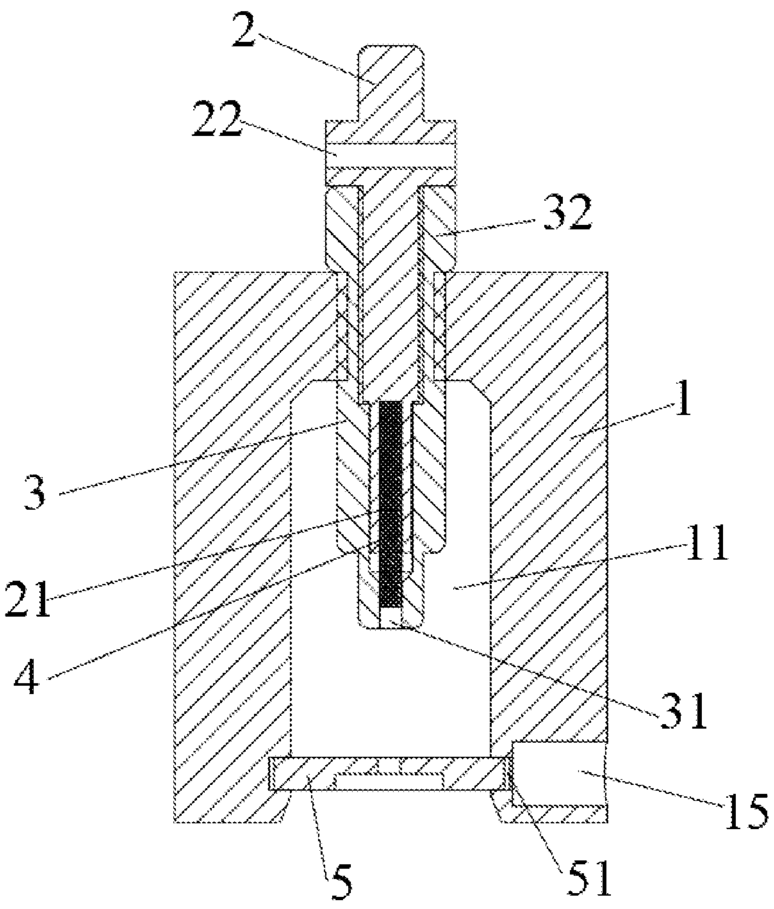
FIG. 2 is a cross-sectional view of a structure of a dismounting device according to the present utility model.

An embodiment of the present utility model provides a dismounting device for a worm or gear on a motor shaft, referring to FIGS. 1 and 2, the worm or gear is mounted on a drive shaft of a motor, and the dismounting device comprises a main housing 1, wherein the main housing 1 is provided with a dismounting cavity 11 for a dismounting operation, and the dismounting cavity 11 comprises a first end and a second end that are oppositely arranged;

- the first end is provided with a slot 12 for inserting the drive shaft, the worm or gear is positioned inside the dismounting cavity 11, and a main body of the motor is positioned outside the dismounting cavity 11;
- the second end is provided with a dismounting assembly, wherein the dismounting assembly comprises an inner sleeve 2 and an outer sleeve 3, the outer sleeve 3 extends into the dismounting cavity 11 through the second end, and one end of the outer sleeve 3 is provided with a first positioning hole 31 being docked with one end of the drive shaft; and
- the inner sleeve 2 is mounted inside the outer sleeve 3, and one end that is of the inner sleeve 2 and that is inserted into the outer sleeve 3 is provided with a second positioning hole 21, wherein the second positioning hole 21 and the first positioning hole 31 are coaxially arranged, and a thimble 4 used to run through the first positioning hole 31 to be docked with the drive shaft is mounted in the second positioning hole 21.

It should be noted that, the embodiment has improved the structure of the existing dismounting device, and through a structure that adopts an inner sleeve and an outer sleeve 3 and combines a spacer 5, the motor can be quickly positioned, and the drive shaft of the motor and the thimble 4 can be coaxially arranged, thereby ensuring the concentricity therebetween, such that in the dismounting process, the misalignment is avoided, the motor is protected from damage, and both hands of the operator can be effectively protected, and therefore the safety of the dismounting process is ensured.

Specifically, in this embodiment, when dismounting the worm or gear on the drive shaft of the motor, the drive shaft is inserted from the slot 12 at the first end of the dismounting cavity 11 to position the worm or gear on the drive shaft in the dismounting cavity 11, and at this time, the bottom of the worm or gear is abutted against an upper surface of the slot 12 to limit the bottom of the worm or gear. Then, the outer sleeve 3 is run through the second end of the dismounting cavity 11 to extend one end that is of the outer sleeve 3 and that is provided with the first positioning hole 31 into the dismounting cavity 11, and the drive shaft is inserted into the first positioning hole 31. After being mounted in place, one end of the first positioning hole 31 is abutted against the top of the worm or gear, and at this time, the worm or gear is tightly clamped between the outer sleeve 3 and the slot 12 to ensure the overall stability of the motor, and the drive shaft is coaxially inserted into the first positioning hole 31. Then, according to the size of the drive shaft, a thimble 4 is selected to be mounted in the second positioning hole 21 at one end of the inner sleeve 2, and the inner sleeve 2 provided with the thimble 4 is inserted into the outer sleeve 3. Since the first positioning hole 31 and the second positioning hole 21 are coaxially arranged, one end of the thimble 4 is nailed in the second positioning hole 21, and the other end is docked with the first positioning hole 31, such that the thimble runs through the first positioning hole 31 and is tightly propped on the drive shaft. At this time, the worm or gear as a whole is tightly clamped between the outer sleeve 3 and the slot 12, and the drive shaft and the motor as a whole are abutted against the thimble 4 at the end of the inner sleeve 2; and at this time, the worm or gear is required to be separated from the drive shaft, and the inner sleeve 2 is pressed down in the outer sleeve 3 so as to press the thimble 4 down, and the drive shaft will be pressed down by the thimble 4 without moving the worm or gear that is tightly clamped, thereby separating the worm or gear from the drive shaft.

It should be noted that, in order to ensure the stability when mounting the dismounting assembly and facilitate pressing the inner sleeve 2 down within the outer sleeve 3 during the dismounting process, in this embodiment, the outer sleeve 3 is threadingly mounted to the second end of the dismounting cavity 11, and correspondingly, the second end of the main housing 1 is provided with a threaded hole, and an outer side of the outer sleeve 3 is only required to be provided with an external threaded structure. When mounting, the outer sleeve 3 is only required to be screwed into the second end, which can further prevent the outer sleeve 3 from shaking, ensure the stability of the structure, ensure good coaxiality between the outer sleeve 3 and the drive shaft, and facilitate a subsequent accurate docking of the thimble 4 of the inner sleeve 2 with the drive shaft.

Similarly, in this embodiment, the inner sleeve 2 is threadingly mounted inside the outer sleeve 3. Specifically, the outer sleeve 3 can be internally provided with an internal threaded structure, and an outer side of the inner sleeve 2 can be provided with an external threaded structure. When mounting the inner sleeve 2, the inner sleeve is only required to be screwed into the outer sleeve 3 via the threaded structures, to ensure that the inner sleeve 2 only goes up and down in the outer sleeve 3 without shaking, such that good coaxiality is realized. In this way, the axes of the inner sleeve 2, the outer sleeve 3, the drive shaft and the thimble 4 are collinear. When dismounting, the inner sleeve 2 can be pressed down in the outer sleeve 3 by only screwing the inner sleeve 2, which applies the force from the thimble 4 on the drive shaft along an axial direction completely, such that a relative movement between the thimble 4 and the drive shaft is effectively avoided, and the thimble 4 or the motor is prevented from being damaged.

Further, a nut 32 is mounted on one end that is of the outer sleeve 3 and that is positioned outside the dismounting cavity 11. When mounting the outer sleeve 3, the outer sleeve 3 can be rotated by applying an acting force on the nut 32, such that the mounting is facilitated. Meanwhile, the outer sleeve 3 can be further tightened or be dismounted by means of an external wrench.

Further, it should be noted that, since the connection between the worm or gear and the drive shaft is very tight, it is very difficult to apply a sufficient rotational force directly with hands to drive the inner sleeve 2 to rotate for separating the drive shaft from the worm or gear. In this embodiment, in order to facilitate the rotation of the inner sleeve 2, one end that is of the inner sleeve 2 and that is positioned outside the outer sleeve 3 is radially provided with a through hole 22, and it is possible to easily screw the inner sleeve 2 by inserting a long rod into the through hole 22 and rotating the long rod with hands, thereby making the dismounting more labor-saving.

Further, since different types of motors have different diameters of the drive shafts, in order to facilitate mounting the drive shaft and fit different types of motors, in this embodiment, a spacer 5 is detachably mounted to the first end of the dismounting cavity 11, and the slot 12 is formed in the spacer 5. Several spacers 5 can be provided, and the slots 12 in the spacers 5 can be different in size. According to the corresponding motor types to be dismounted, different spacers 5 are selected and mounted to the first end of the dismounting cavity 11 to improve the versatility of the dismounting device.

Further, the first end of the dismounting cavity 11 is symmetrically provided with sliding grooves 14 for mounting the spacer 5, and both sides of the spacer 5 are slidably inserted into the sliding grooves 14. It is very convenient to mount and dismount the spacer 5 by inserting and mounting the spacer through the sliding grooves 14, and the efficiency of the dismounting operation can be improved.

Further, in order to prevent the spacer 5 from shaking in the sliding grooves 14 and ensure the stability of the spacer 5, in this embodiment, a side surface of the main housing 1 is provided with a limiting hole 15 being communicated with the sliding groove 14, and a side surface of the spacer 5 is provided with a limiting groove 51 corresponding to the limiting hole 15. Before the dismounting operation, a limiting pin can be inserted into the limiting hole 15, such that one end of the limiting pin is stuck in the limiting groove 51 on the side surface of the spacer 5, thereby effectively preventing the spacer 5 from sliding through a simple structure and a convenient operation.

Further, a port of the slot 12 is provided with rounded structures 13. When mounting the drive shaft, the rounded structures have a good guiding effect, and meanwhile, by providing the rounded structures 13, the hands of the operator can be prevented from being scratched by the port of the slot 12, thereby improving the safety in use.

Further, when the dismounting device in this embodiment is used for a dismounting operation, the operator is usually required to hold the main housing 1 tight with one hand and rotate the inner sleeve 2 with the other hand, and in this embodiment, in order to facilitate holding the main housing 1 tight by the operator and improve the comforts in use, a main body of the main housing 1 is provided as a cylindrical structure that is convenient for the operator to hold.

The above mentioned contents are only optional embodiments of the present utility model and are not intended to limit the patent scope of the present utility model, and under the utility model concept of the present utility model, the equivalent structural transformations made by using the contents of the specification and the drawings of the present utility model, or direct/indirect applications to other related technical fields, are all included in the patent protection scope of the present utility model.

The invention claimed is:

1. A dismounting device for a worm or gear on a drive-shaft of a motor, the dismounting device comprising a main housing, wherein the main housing is provided with a dismounting cavity for a dismounting operation, and the dismounting cavity comprises a first end and a second end that are oppositely arranged;

the first end is provided with a spacer detachably mounted to the first end and a slot formed in the spacer, the slot configured to receive the drive shaft while the worm or gear is positioned inside the dismounting cavity and a main body of the motor is positioned outside the dismounting cavity;

the second end is provided with a dismounting assembly, wherein the dismounting assembly comprises an inner sleeve and an outer sleeve, the outer sleeve is threadingly mounted to the second end of the dismounting cavity and extends into the dismounting cavity through the second end, and one end of the outer sleeve is provided with a first positioning hole configured to be inserted by an end of the drive shaft; and the inner sleeve is mounted inside the outer sleeve, and one end that is of the inner sleeve and that is inserted into the outer sleeve is provided with a second positioning hole, wherein the second positioning hole and the first positioning hole are coaxially arranged, and a thimble is mounted in the second positioning hole and runs through the first positioning hole and configured to abut against the end of the drive shaft when the inner sleeve is pressed downward, the thimble is pressed by the inner sleeve to move downward, and the drive shaft is configured to be pressed by the thimble to move downward without moving the worm or gear that is clamped inside the dismounted cavity between the outer sleeve and the slot, thereby separating the worm or gear from the drive shaft.

2. The dismounting device according to claim 1, wherein a port of the slot is provided with rounded structures.

3. The dismounting device according to claim 1, wherein the first end of the dismounting cavity is symmetrically provided with sliding grooves configured to mount the spacer, and both sides of the spacer are slidably inserted into the sliding grooves.

4. The dismounting device according to claim 1, wherein a side surface of the main housing is provided with a limiting hole being communicated with a sliding groove, and a side surface of the spacer is provided with a limiting groove corresponding to the limiting hole.

5. The dismounting device according to claim 1, wherein a nut is mounted to one end that is of the outer sleeve and that is positioned outside the dismounting cavity.

6. The dismounting device according to claim 1, wherein the inner sleeve is threadingly mounted inside the outer sleeve.

7. The dismounting device according to claim 1, wherein one end that is of the inner sleeve and that is positioned outside the outer sleeve is radially provided with a through hole.

8. The dismounting device according to claim 1, wherein a main body of the main housing is provided as a cylindrical structure.

* * * * *